(12) United States Patent
Garvey

(10) Patent No.: US 8,548,749 B1
(45) Date of Patent: Oct. 1, 2013

(54) PATH CLASSIFICATION AND ESTIMATION METHOD AND SYSTEM FOR PROGNOSTICATING ASSET LIFE

(71) Applicant: Dustin R. Garvey, Oakland, CA (US)

(72) Inventor: Dustin R. Garvey, Oakland, CA (US)

(73) Assignee: Intellectual Assests LLC, Lake Tahoe, NV (US)

( * ) Notice: Subject to any disclaimer, the term of this patent is extended or adjusted under 35 U.S.C. 154(b) by 0 days.

(21) Appl. No.: 13/830,951

(22) Filed: Mar. 14, 2013

Related U.S. Application Data

(62) Division of application No. 12/315,117, filed on Nov. 28, 2008.

(60) Provisional application No. 61/005,057, filed on Nov. 30, 2007.

(51) Int. Cl.
*G01B 3/44* (2006.01)

(52) U.S. Cl.
USPC ............................................................ 702/34

(58) Field of Classification Search
USPC ............................................................ 702/34
See application file for complete search history.

(56) References Cited

U.S. PATENT DOCUMENTS 6,411,908 B1 * 6/2002 Talbott ........................... 702/34

* cited by examiner

*Primary Examiner* — Stephen Cherry
(74) *Attorney, Agent, or Firm* — Dennis A. DeBoo

(57) ABSTRACT

Path classification and estimation method and system used in combination with a computer and memory for prognosticating the remaining useful life of an asset by classifying a current degradation path of a current asset as belonging to one or more of previously collected degradation paths of exemplary assets and using the resulting classifications to estimate the remaining useful life of the current asset.

12 Claims, 15 Drawing Sheets

A computer-implemented method for estimating a remaining useful life of a current asset, comprising the steps of:

Obtaining exemplar degradation data from at least two example assets;

Acquiring current asset degradation data from a current asset;

Classifying the current asset degradation data as a function of similarity between the current asset degradation data and the exemplar degradation data; and Estimating a remaining useful life of the current asset using results of the classification step.

FIG. 4

```
┌─────────────────────────────────────────────────────────────────────┐
│ A computer-implemented method for estimating a remaining useful life of a │
│ current asset, comprising the steps of:                             │
└─────────────────────────────────────────────────────────────────────┘
                                    │
┌─────────────────────────────────────────────────────────────────────┐
│ Obtaining exemplar degradation data from at least two example assets; │
└─────────────────────────────────────────────────────────────────────┘
                                    │
┌─────────────────────────────────────────────────────────────────────┐
│ Transforming the exemplar degradation data into functional approximations │
│ defining exemplar degradation paths;                                │
└─────────────────────────────────────────────────────────────────────┘
                                    │
┌─────────────────────────────────────────────────────────────────────┐
│ Acquiring current asset degradation data from a current asset;      │
└─────────────────────────────────────────────────────────────────────┘
                                    │
┌─────────────────────────────────────────────────────────────────────┐
│ Transforming the current asset degradation data into a current functional │
│ approximation defining a current asset degradation path;            │
└─────────────────────────────────────────────────────────────────────┘
                                    │
┌─────────────────────────────────────────────────────────────────────┐
│ Classifying the current asset degradation data by determining a plurality of │
│ similarities each quantifying a degree of similarity of the current asset │
│ degradation path to at least one of the exemplar degradation paths; and │
└─────────────────────────────────────────────────────────────────────┘
                                    │
┌─────────────────────────────────────────────────────────────────────┐
│ Estimating a remaining useful life of the current asset using the determined │
│ plurality of similarities.                                          │
└─────────────────────────────────────────────────────────────────────┘
```

FIG. 5

```
┌─────────────────────────────────────────────────────────────────┐
│ A computer-implemented method for estimating a remaining useful │
│ life of a current asset, comprising the steps of:               │
└─────────────────────────────────────────────────────────────────┘
                                 │
┌─────────────────────────────────────────────────────────────────┐
│ Obtaining exemplar degradation data from at least two exemplar  │
│ assets;                                                          │
└─────────────────────────────────────────────────────────────────┘
                                 │
┌─────────────────────────────────────────────────────────────────┐
│ Constructing a vector of exemplar failure times and a vector of │
│ functional approximations from the exemplar degradation data;   │
└─────────────────────────────────────────────────────────────────┘
                                 │
┌─────────────────────────────────────────────────────────────────┐
│ Acquiring observed degradation data from a current asset over a │
│ period of time that includes a defined time t;                   │
└─────────────────────────────────────────────────────────────────┘
                                 │
┌─────────────────────────────────────────────────────────────────┐
│ Subtracting the defined time t from each of the exemplar        │
│ failure times for obtaining a vector of expected remaining      │
│ useful lives;                                                   │
└─────────────────────────────────────────────────────────────────┘
                                 │
┌─────────────────────────────────────────────────────────────────┐
│ Evaluating the vector of functional approximations at the       │
│ defined time t for obtaining a vector of expected degradation   │
│ data values;                                                    │
└─────────────────────────────────────────────────────────────────┘
                                 │
┌─────────────────────────────────────────────────────────────────┐
│ Evaluating the observed degradation data at the defined time t  │
│ for obtaining an observed degradation data value;               │
└─────────────────────────────────────────────────────────────────┘
                                 │
┌─────────────────────────────────────────────────────────────────┐
│ Classifying the observed degradation data value as a function   │
│ of the expected degradation data values by assigning a          │
│ membership value to each of the expected degradation data       │
│ values as a function of similarity to the observed degradation  │
│ data value for obtaining a vector of memberships; and           │
└─────────────────────────────────────────────────────────────────┘
                                 │
┌─────────────────────────────────────────────────────────────────┐
│ Combining the vector of memberships with the vector of expected │
│ remaining useful lives for estimating a remaining useful life   │
│ value for the current asset.                                    │
└─────────────────────────────────────────────────────────────────┘
```

FIG. 14

|  |  | MAE (hrs) | Life (hrs) | MAE (% Life) |
|---|---|---|---|---|
| Pop. | MI | 45.7 | 76.3 | 59.9% |
| Pop. | PTO | 45.3 | 86.0 | 52.7% |
| Cause | MI | 5.3 | 76.3 | 6.9% |
| Cause | PTO | 2.1 | 86.0 | 2.4% |
| Effect | MI | 1.2 | 159.2 | 0.8% |
| Effect | PTO | 11.4 | 86.0 | 13.2% |

FIG. 15

| Power Supply ID | Regressed Equation | Time After OTF (days) |
|---|---|---|
| Training PS #1 | $6098 \times t$ | 16.11 |
| Training PS #2 | $1211 \times t$ | 5.30 |
| Validation PS | $3214 \times t$ | 10.71 |

FIG. 16

|  | Lower 95% | Median | Upper 95% |
|---|---|---|---|
| Full (days) | −2.47 | 0.81 | 3.34 |
| First ½ (days) | −3.92 | 1.60 | 3.61 |
| Last ½ (days) | −2.47 | 0.65 | 1.49 | though model
PATH CLASSIFICATION AND ESTIMATION METHOD AND SYSTEM FOR PROGNOSTICATING ASSET LIFE

CROSS-REFERENCE TO RELATED APPLICATIONS

This application is a divisional application of (and claims the benefit of priority under 35 U.S.C. §§120 and 121 to) U.S. application Ser. No. 12/315,117, filed Nov. 28, 2008, currently pending and which is hereby incorporated by reference herein in its entirety and which claims priority under 35 USC Section 119(e) to U.S. Provisional Patent Application No. 61/005,057, filed Nov. 30, 2007, the entire disclosure of which is incorporated herein by reference in its entirety.

FIELD OF THE INVENTION

This invention relates generally to prognostic methods and systems, and in particular, to a path classification and estimation (PACE) method and system for prognosticating the remaining useful life (RUL) of an asset.

BACKGROUND OF THE INVENTION

In recent years, the field of prognostics has reached buzzword status. The result of which has been an avalanche of literature describing many different prognostic algorithms that are supposedly capable of estimating the remaining useful life (RUL) of an individual asset. However, upon closer examination, it is evident that the current state of the art is cluttered with methods that either do not produce estimates of the RUL or do not provide a realistic method for relating degradation to the RUL.

For example, a general path model (GPM) (Lu, C. Joseph and William Q. Meeker, "Using Degradation Measures to Estimate a Time-to-Failure Distribution", *Technometrics*, Vol. 35, No. 2, pp. 161-174: May 1993.) is founded on the concept that a degradation signal collected from an individual asset will follow a general path until it reaches an associated failure threshold. Since its introduction, the thought model proposed in the GPM has been prolifically adopted by modern researchers and has resulted in a plethora of techniques that can be related to the GPM in one way or another. Examples of these techniques can be found in the following publications: Upadhyaya, Belle R., Masoud Naghedolfeizi, and B. Raychaudhuri, "Residual Life Estimation of Plant Components", *Periodic and Predictive Maintenance Technology*, pages 22-29: June 1994; Mishra, S. and M. Pecht, "In-situ Sensors for Product Reliability Monitoring", *Proceedings of the SPIE*, Vol. 4755, pages 10-19: 2002; Loecher, M. and C. Darken, "Concurrent Estimation of Time-to-Failure and Effective Wear", *Proceedings of the Maintenance and Reliability Conference (MARCON)*, Knoxville, Tenn.: May 4-7, 2003; Mishra, S., S. Ganesan, M. Pecht and J. Xie, "Life Consumption Monitoring for Electronic Prognostics", *Proceedings of the IEEE Aerospace Conference*, Vol. 5, pages 3455-3467: Mar. 6-13, 2004; Yan, Jihong, Muammer Koc, and Jay Lee, "A Prognostic Algorithm for Machine Performance Assessment and Its Applications", *Production Planning & Control*, Vol. 15, No. 8, pages 796-801: December 2004; Xu, Di and Wenbiao Zhao, "Reliability Prediction using Multivariate Degradation Data", *Proceedings of the Annual Reliability and Maintainability Symposium*, pages 337-341, Alexandria, Va.: Jan. 24-27, 2005; Liao, Haitao, Wenbiao Zhao, and Huairui Guo, "Predicting Remaining Useful Life of an Individual Unit Using Proportional Hazards Model and Logistic Regression Model", *Proceedings of the Reliability and Maintainability Symposium (RAMS)*, pages 127-132: Jan. 23-26, 2006; and Vichare, Nikhil M., and Michael G. Pecht, "Prognostic and Health Management of Electronics", *IEEE Transactions on Components and Packaging Technologies*, Vol. 29, No. 1, pages 222-229: March 2006.

Now, from the cursory description of the general path model (GPM) hereinabove, it can be seen that there are two fundamental assumptions of the GPM and its modern counterparts: First, there exists a path for the degradation signal that can be parameterized via regression, machine learning, et cetera and secondly, there exists a failure threshold for the degradation signal that accurately predicts when a asset will fail. For modern computational capacity, the first assumption is minor, in that many methods exist for parameterizing simple (polynomial regression, power regression, et cetera) and complex (fuzzy inference systems, neural networks, et cetera) relationships from data. The assumption of the existence of a threshold that accurately predicts asset failure is not so easily reconciled. While the existence of a failure threshold has been shown to be valid for well understood degradation processes (for example, seeded crack growth) and controlled testing environments (for example, constant load or uniform cycling), the above referenced publication to Liao, et al., titled "Predicting Remaining Useful Life of an Individual Unit Using Proportional Hazards Model and Logistic Regression Model" observes that for real world applications, where the failure modes are not always well understood or can be too complex to be quantified by a single threshold, the failure boundary is vague at best. Wang, et al. attempt to address this problem by integrating uncertainty into the estimate of the threshold (Wang, Peng and David W. Coit, "Reliability and Degradation Modeling with Random or Uncertain Failure Threshold", *Proceedings of the Annual Reliability and Maintainability Symposium*, Las Vegas, Nev.: Jan. 28-31, 2007), but in the end the authors replace an estimate of the threshold with another, more conservative estimate.

For the most part modern prognostic methods have failed to actually produce estimates of the RUL; however, it is important to note that there are methods available that actually estimate the RUL of an individual asset. For example, most notably Bonissone, et al. (Bonissone, P. and K. Goebel (2002), "When Will It Break? A Hybrid Soft Computing Model to Predict Time-to-Break Margins in Paper Machines", *Proceedings of SPIE 47th Annual Meeting, International Symposium on Optical Science and Technology*, Vol. 4785, pages 53-64: 2002) use a complex system involving many statistical and artificial intelligence based methods to infer the RUL of a paper machine. However, the sheer complexity and poor estimate accuracy limited the applicability of this work to an academic forum.

Hence, there is a need for a method and system for prognosticating the remaining useful life (RUL) of an asset that ameliorates or overcomes one or more of the shortcomings of the known prior art.

BRIEF SUMMARY OF THE INVENTION

Accordingly, and in one aspect, an embodiment of the invention ameliorates or overcomes one or more of the significant shortcomings of the known prior art by performing two main operations to estimate a remaining useful life (RUL) of an asset, namely classification and estimation. First, degradation of an asset is classified according to expected/example asset degradations. Second, the remaining useful life (RUL) of the asset is estimated by combining class memberships with expected/example remaining lifetimes.

More particularly, and in one aspect, an embodiment of the invention provides a path classification and estimation (PACE) method and system for prognosticating a remaining useful life (RUL) of an individual asset wherein observations of the individual asset's degradation are classified according to previously acquired examples of asset degradations and the result of the classification is used to estimate the RUL of the individual asset. Hence, an embodiment of the invention provides a prognostic method and system that provides accurate estimates of the RUL of an individual asset in many different contexts.

Additionally, and in another aspect, an embodiment of the invention provides a path classification and estimation (PACE) method and system that has extreme flexibility to incorporate multiple degradation signals, degradation signals with and without failure thresholds, expert opinion, any degradation signal provided it can be represented as a function that maps asset life to expected degradation signal values, and any inference procedure for classifying the degradation and/or estimating the RUL.

Furthermore, and in another aspect, an embodiment of the invention provides a prognostic method and system comprising path classification and estimation (PACE) for prognosticating the remaining useful life (RUL) of an asset wherein a degradation signal of an individual asset is allowed to indicate life uniquely in stark contrast to the prior art method of concluding that the individual asset has failed if its degradation signal exceeds a chosen threshold.

In a further aspect, an embodiment of the invention provides a computer-implemented method for estimating a remaining useful life of a current asset, comprising the steps of: obtaining exemplar degradation data from at least two example assets; acquiring current asset degradation data from a current asset; classifying the current asset degradation data as a function of similarity between the current asset degradation data and the exemplar degradation data; and estimating a remaining useful life of the current asset using results of the classification step. Additionally, an embodiment of the invention provides a computer-readable medium having computer executable instructions recorded thereon which causes, in use, a computer running the instructions to execute a procedure according to the above computer-implemented method.

In another further aspect, an embodiment of the invention provides a computer-implemented method for estimating a remaining useful life of a current asset, comprising the steps of: obtaining exemplar degradation data from at least two example assets; transforming the exemplar degradation data into functional approximations defining exemplar degradation paths; acquiring current asset degradation data from a current asset; transforming the current asset degradation data into a current functional approximation defining a current asset degradation path; classifying the current asset degradation data by determining a plurality of similarities each quantifying a degree of similarity of the current asset degradation path to at least one of the exemplar degradation paths; and estimating a remaining useful life of the current asset using the determined plurality of similarities. Additionally, an embodiment of the invention provides a computer-readable medium having computer executable instructions recorded thereon which causes, in use, a computer running the instructions to execute a procedure according to the above computer-implemented method.

In another further aspect, an embodiment of the invention provides a computer-implemented method for estimating a remaining useful life of a current asset, comprising the steps of: obtaining exemplar degradation data from at least two exemplar assets; constructing a vector of exemplar failure times and a vector of functional approximations from the exemplar degradation data; acquiring observed degradation data from a current asset over a period of time that includes a defined time t; subtracting the defined time t from each of the exemplar failure times for obtaining a vector of expected remaining useful lives; evaluating the vector of functional approximations at the defined time t for obtaining a vector of expected degradation data values; evaluating the observed degradation data at the defined time t for obtaining an observed degradation data value; classifying the observed degradation data value as a function of the expected degradation data values by assigning a membership value to each of the expected degradation data values as a function of similarity to the observed degradation data value for obtaining a vector of memberships; and combining the vector of memberships with the vector of expected remaining useful lives for estimating a remaining useful life value for the current asset. Additionally, an embodiment of the invention provides a computer-readable medium having computer executable instructions recorded thereon which causes, in use, a computer running the instructions to execute a procedure according to the above computer-implemented method.

In another further aspect, an embodiment of the invention provides an asset surveillance system for estimating a remaining useful life of a current asset, said system comprising: means for obtaining exemplar degradation data from at least two example assets; a data acquisition device for acquiring current asset degradation data from a current asset; classification means for classifying said current asset degradation data as a function of similarity between said current asset degradation data and said exemplar degradation data; and means for estimating a remaining useful life of the current asset using results of the classification.

In another further aspect, an embodiment of the invention provides a system for estimating a remaining useful life of a current asset, said system comprising: means for obtaining exemplar degradation data from at least two example assets; means for transforming the exemplar degradation data into functional approximations defining exemplar degradation paths; a data acquisition device for acquiring current asset degradation data from a current asset; means for transforming the current asset degradation data into a current functional approximation defining a current asset degradation path; means for classifying the current asset degradation data by determining a plurality of similarities each quantifying a degree of similarity of the current asset degradation path to at least one of the exemplar degradation paths; and means for estimating a remaining useful life of the current asset using the determined plurality of similarities.

In yet another further aspect, an embodiment of the invention provides a system for estimating a remaining useful life of a current asset, said system comprising: means for obtaining degradation data from at least two exemplar assets; means for constructing a vector of exemplar failure times and a vector of functional approximations from the obtained degradation data; a data acquisition device for acquiring observed degradation data from a current asset over a period of time that includes a defined time t; means for subtracting the defined time t from each of the exemplar failure times for obtaining a vector of expected remaining useful lives; means for evaluating the vector of functional approximations at the defined time t for obtaining a vector of expected degradation data values; means for evaluating the observed degradation data at the defined time t for obtaining an observed degradation data value; means for classifying the observed degradation data value as a function of the expected degradation data values by assigning a membership value to each of the expected degradation data values as a function of similarity to the observed degradation data value for obtaining a vector of memberships; and means for combining the vector of memberships with the vector of expected remaining useful lives for estimating a remaining useful life value for the current asset.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 4 is a general flowchart view of an embodiment of a computer-implemented method for estimating a remaining useful life of a current asset.

FIG. 5 is a flowchart view further detailing an embodiment of a computer-implemented method for estimating a remaining useful life of a current asset.

FIG. 14 is a flowchart view further detailing an embodiment of a computer-implemented method for estimating a remaining useful life of a current asset.

FIG. 15 illustrates a summary table of prognoser accuracies for mud invasion (MI) and pressure transducer offset (PTO) failures.

FIG. 16 illustrates a summary table of training and validation degradation data for power supply assets which include a training power supply (PS) number one, a training power supply (PS) number two, and a validation power supply (PS).

DETAILED DESCRIPTION OF THE INVENTION

Figure 1:
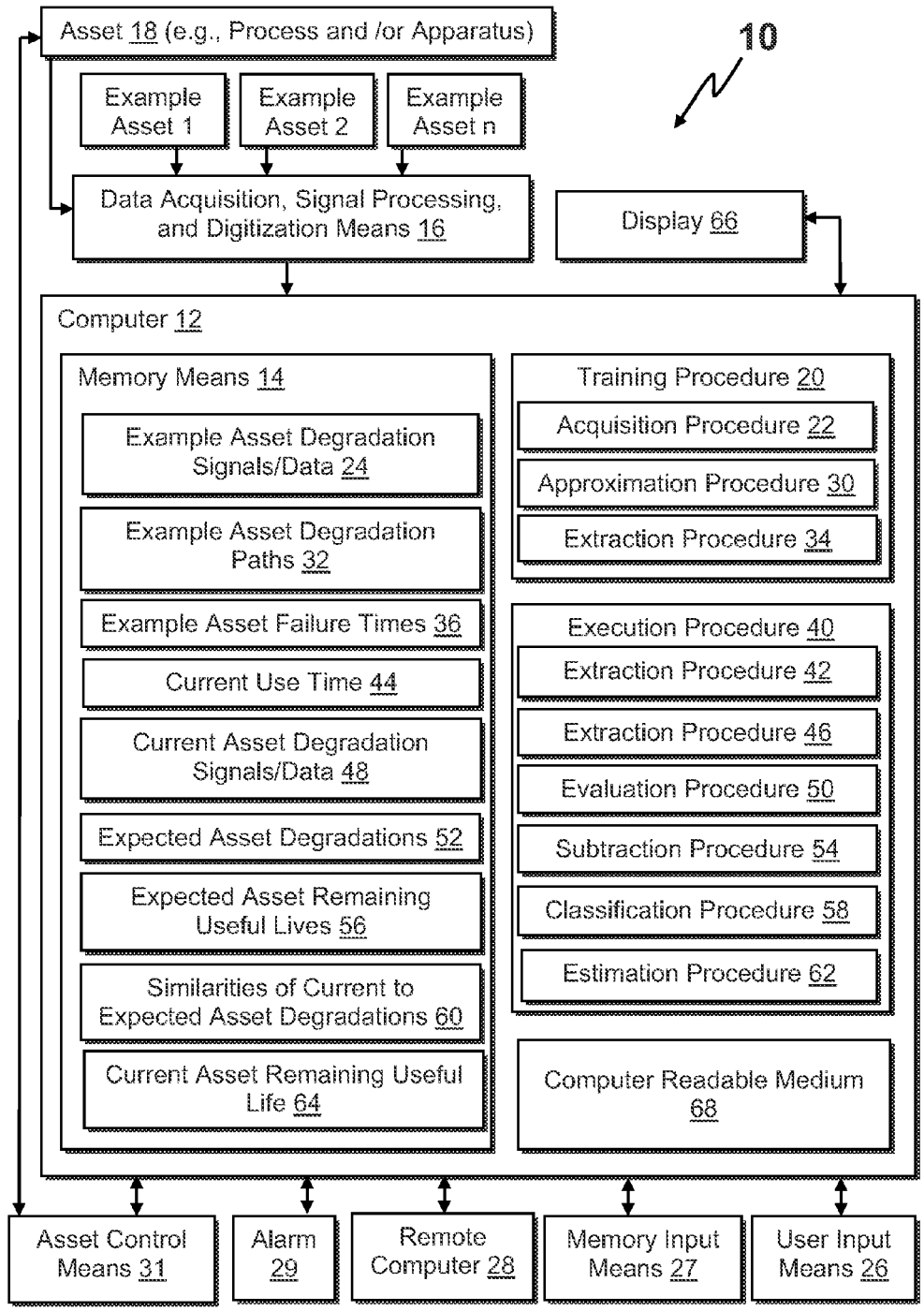
FIG. 1 is a functional block diagram of an embodiment of a path classification and estimation method and system for prognosticating the remaining useful life of an asset.

Considering the drawings, wherein like reference numerals denote like parts throughout the various drawing figures, reference numeral 10 is directed to a path classification and estimation (PACE) method and system for prognosticating the remaining useful life (RUL) of an asset.

Referring to FIG. 1, and in one embodiment, the path classification and estimation (PACE) method and system 10 is comprised of an example asset degradations procedure or training procedure 20 and an execution procedure 40 which are, in one embodiment, implemented with software running on a computer 12 having an associated memory means 14 for prognosticating the remaining useful life (RUL) of at least one asset 18.

Figure 2:
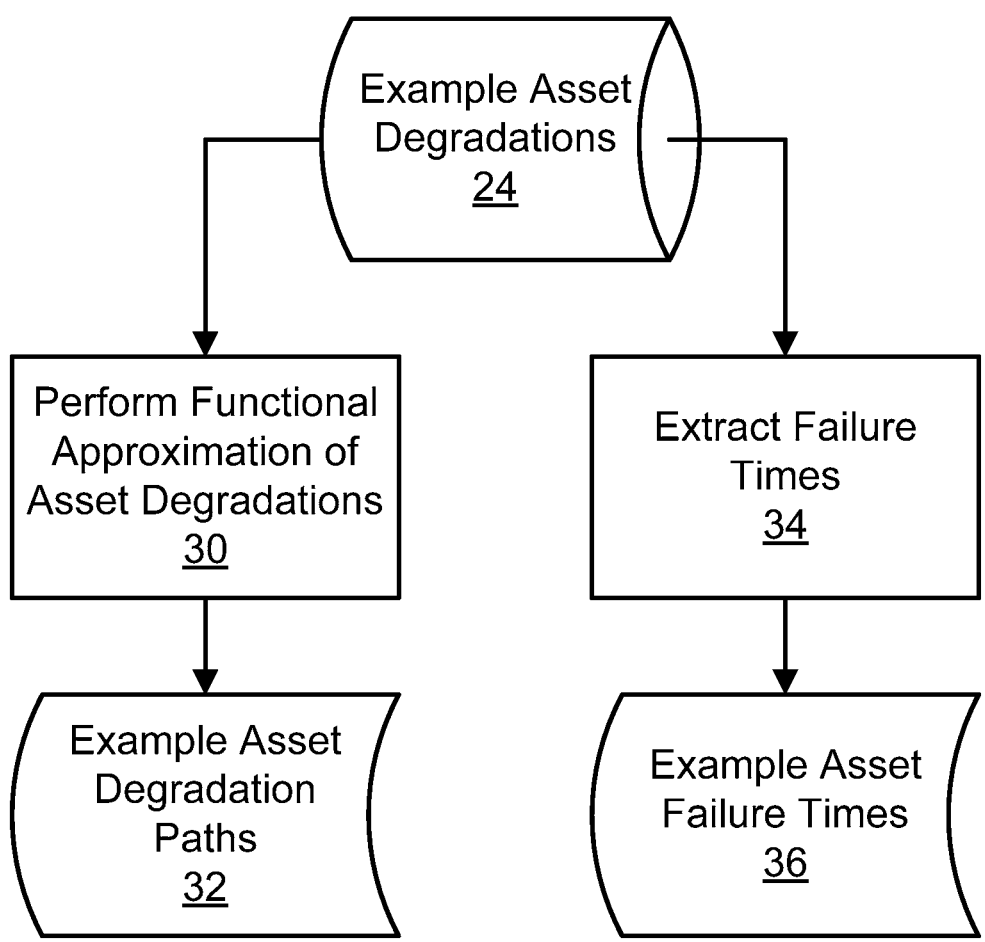
FIG. 2 is a functional flow diagram detailing an embodiment of a training procedure of the path classification and estimation method and system for prognosticating the remaining useful life of an asset.
Figure 3:
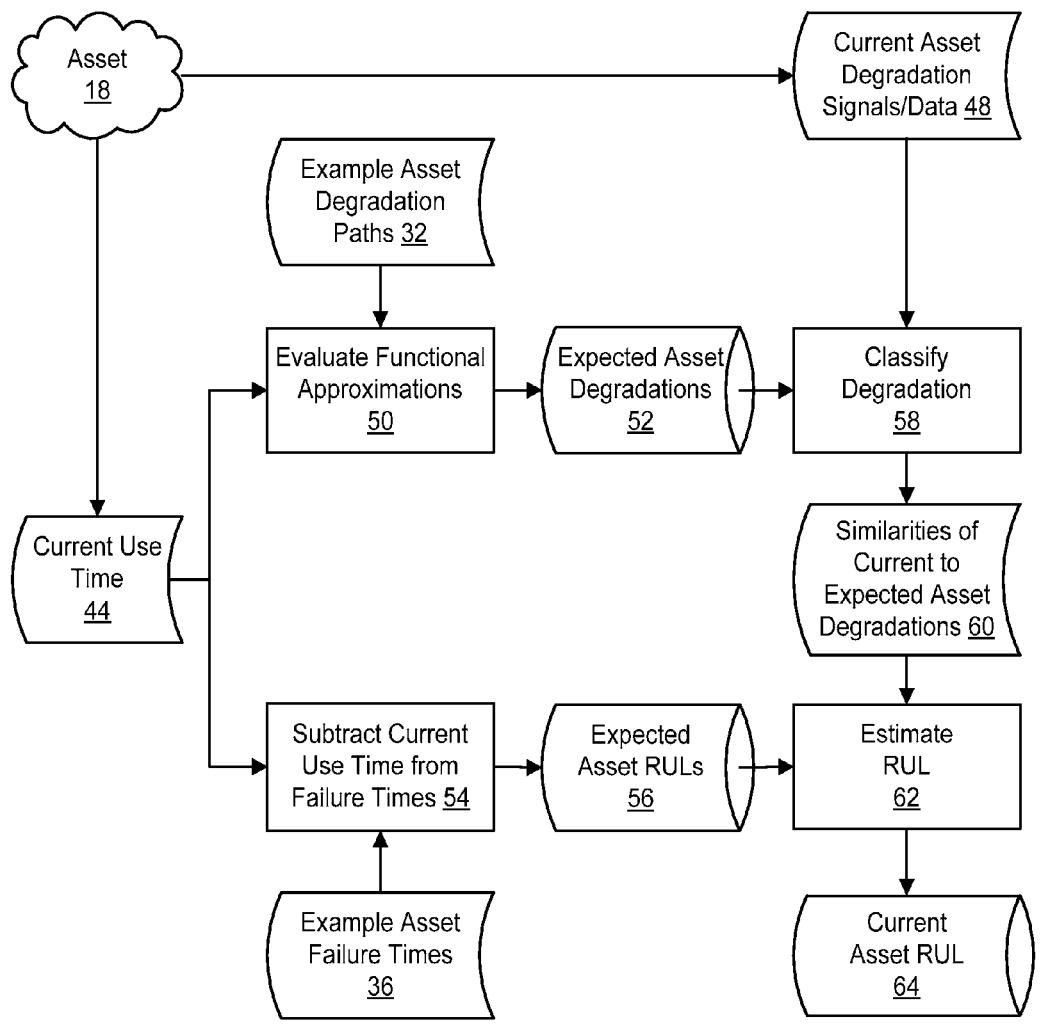
FIG. 3 is a functional flow diagram detailing an embodiment of an execution procedure of the path classification and estimation method and system for prognosticating the remaining useful life of an asset.

More specifically, and referring to FIGS. 1 through 3, the method and system 10 includes the example asset degradations procedure or training procedure 20 which initially performs an acquisition procedure 22 for acquiring example asset degradation signals or data 24 of at least two example assets (e.g., Example Asset Number 1 and Example Asset Number 2) and for storing the example asset degradation signals or data 24 in memory means 14. The acquisition of the asset degradation signals or data 24 from at least the two example assets can be provided by a data acquisition, signal processing, and digitization means 16 electrically coupled between the computer 12 and at least the two example assets. The asset degradation signals or data 24 can also be acquired by memory means 14 of the computer 12 via, for example, user input means 26, memory input means 27, and/or remote computer means 28. Once acquired, the asset degradations procedure or training procedure 20 determines shapes of asset degradations and times at which the example assets fail from the example asset degradation signals or data 24.

In particular, and referring to FIGS. 1 and 2, the example asset degradations procedure or training procedure 20 performs an approximation procedure 30 for approximating the example asset degradation signals or data 24 with functions (polynomial, neural network, et cetera) for defining example asset degradation paths 32 and storing the example asset degradation paths 32 in memory means 14. Additionally, the example asset degradations procedure or training procedure 20 performs an extraction procedure 34 for extracting failure times from the example asset degradation signals or data 24 for defining example asset failure times 36 and for storing the example asset failure times 36 in memory means 14.

Referring now to FIGS. 1 and 3, the method and system 10 further includes the execution procedure 40 which employs the stored functions that represent the example asset degradation paths 32 and the associated example asset failure times 36 for prognosticating the remaining useful life (RUL) of another asset such as at least the one asset 18. In one embodiment, the execution procedure 40 starts with an extraction procedure 42 for extracting a current use time 44 from at least the one asset 18 and an extraction procedure 46 for extracting current asset degradation signals or data 48 from at least the one asset 18. The current use time 44 and the current asset degradation signals/data 48 can be acquired by the computer 12 and thus, by memory means 14 via, for example, the data acquisition, signal processing, and digitization means 16 electrically coupled between the computer 12 and at least the one asset 18, user input means 26 electrically coupled to the computer 12, memory input means 27 electrically coupled to the computer 12, and/or remote computer means 28 electrically coupled to the computer 12.

Next, the execution procedure 40 performs an evaluation procedure 50 comprised of evaluating functional approximations of the example asset degradation paths 32 at the current use time 44 to obtain expected asset degradations 52. The execution procedure 40 also performs a subtraction procedure 54 comprised of subtracting the current use time 44 from the example asset failure times 36 to obtain expected asset remaining useful lives 56. At this point, the execution procedure 40 performs a classification procedure 58 comprised of classifying the current asset degradation 48 according to the expected asset degradations 52. In particular, and in one embodiment, the execution process 40 performs the classification procedure 58 comprised of classifying the current asset degradation 48 of at least the one asset 18 by determining a plurality of similarities that each quantify how similar the current asset degradation 48 is to each of the previously collected examples or functions that represent the example asset degradation paths 32 for obtaining similarities of current to expected asset degradations 60. Finally, the execution procedure 40 performs a estimate remaining useful life procedure or estimation procedure 62 comprised of combining the plurality of similarities of current to expected asset degradations 60 with the expected asset remaining useful lives 56 for obtaining an estimation or prognostication of the remaining useful life 64 of at least the one asset 18.

Accordingly, and in one aspect, FIG. 4 illustrates a general flowchart view of an embodiment of a computer-implemented method for estimating a remaining useful life of the current asset 18. Additionally, an embodiment of the invention provides a computer-readable medium 68 having computer executable instructions recorded thereon which causes, in use, the computer 12 running the instructions to generally execute a procedure according to the computer-implemented method illustrated in FIG. 4.

In another aspect, FIG. 5 illustrates a flowchart view further detailing an embodiment of a computer-implemented method for estimating a remaining useful life of the current asset 18. Additionally, an embodiment of the invention provides the computer-readable medium 68 having computer executable instructions recorded thereon which causes, in use, the computer 12 running the instructions to generally execute a procedure according to the computer-implemented method illustrated in FIG. 5.

Generally, any type of computer readable medium 68 may be employed and examples include floppy disks, hard disks, CD-ROMS, Flash ROMS, nonvolatile ROM, and RAM. Additionally, the memory means 14 may be employed for the computer readable medium 68.

Furthermore, and in an embodiment of the invention, a computer-implemented method for estimating the remaining useful life of the current asset 18 can further include one or more of the following steps: communicating the estimated remaining useful life of the current asset to a remote computer 28, sounding an alarm 29 when an alarm action is determined to be necessitated as a function of the remaining useful life of the current asset 18; performing a control action, via asset control means 31, on the current asset 18 when determined to be necessitated as a function of the remaining useful life of the current asset 18; and/or displaying the estimated remaining useful life of the current asset on a display 66.

Moreover, examples of degradation signals include but are not limited to the cumulative absorbed vibration energy, number of thermal cycles, number of uses, number of alarms, magnitude of difference between a predicted parameter and a corresponding observed parameter, cumulative difference between a predicted parameter and a corresponding observed parameter, frequency of fault or anomaly events, cumulative number of fault or anomaly events, measured or computed efficiency (for example pumping efficiency), rate of change of efficiency, output voltage during discharge for a battery, amplitude of Lamb waves measured by piezoelectric transducers in a structure, switching transient gate voltage in a gate controlled transistor, tumor mass, cumulative cigarette consumption, et cetera. Thus, the degradation signal or signals are a type which will now be evident to those having ordinary skill in the art, informed by the present disclosure.

Now that a high level description of the path classification and estimation (PACE) method and system 10 has been presented hereinabove, a further detailed delineation of the path classification and estimation (PACE) method and system 10 will be presented hereinbelow which will then be followed by a description of exemplary applications.

As its name suggests, the path classification and estimation (PACE) method and system 10 is fundamentally comprised of two operations: 1) classifying a current degradation path as belonging to one or more of previously collected exemplar degradation paths and 2) using the resulting classifications to estimate the RUL. Hence, the name path classification (classify path according to exemplar paths) and estimation (estimate the RUL from the results of the classification). At this point, the PACE is described in more detail by considering a hypothetical example.

Illustrative Example

Figure 6:
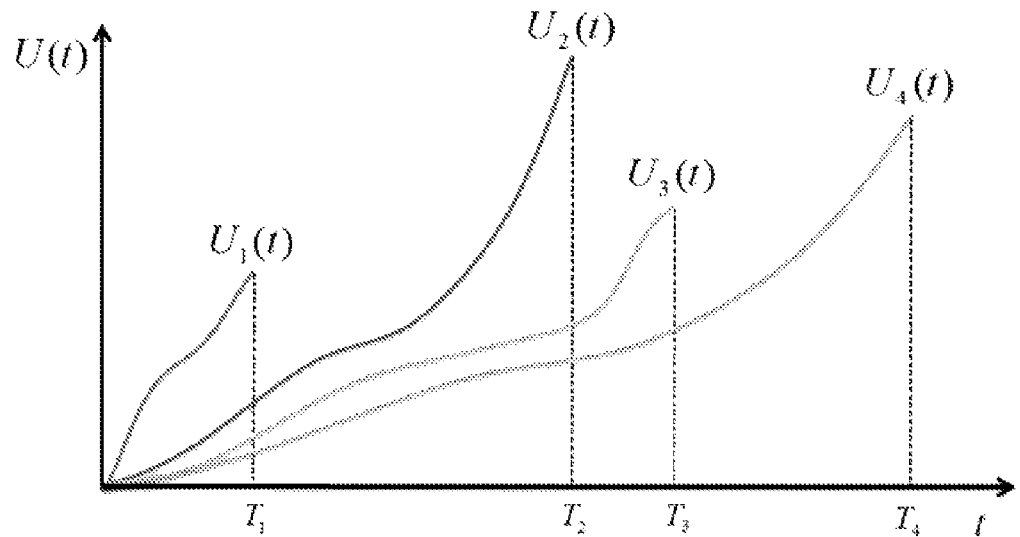
FIG. 6 illustrates a plot of example degradation signals of exemplar assets.
Figure 7:
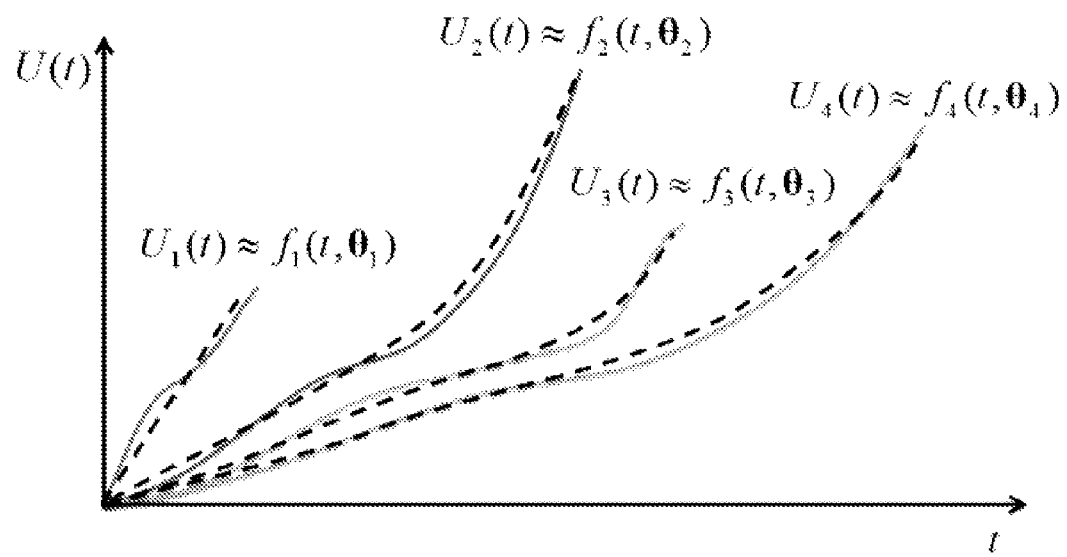
FIG. 7 illustrates a plot of the example degradation signals of exemplar assets illustrated in FIG. 6 and their associated functional approximations shown by dashed lines.

To begin, consider the example degradation signals presented in FIGS. 6 and 7. The degradation signals $U_1(t)$, $U_2(t)$, $U_3(t)$, and $U_4(t)$ and their associated failure times $T_1$, $T_2$, $T_3$, and $T_4$ are presented in the FIG. 6. Here, the failure times are set to be either the time that the asset fails or the time at which someone determines that the asset performance has sufficiently degraded such that it has effectively failed. For this example, it can be seen that there is not a clear failure threshold for the degradation signal. In the FIG. 7, the paths are generalized by fitting an arbitrary function to the data via regression, machine learning, et cetera, for obtaining functional approximations $f_1(t,\theta_1)$, $f_2(t,\theta_2)$, $f_3(t,\theta_3)$, and $f_4(t,\theta_4)$. There are two items of information that are extracted or derived from the degradation paths, specifically the failure times and the shape of the degradation that is described by the functional approximations. These items of information are used to construct a vector of exemplar failure times 36 and functional approximations providing example asset degradation paths 32, as follows:

$$T = \begin{bmatrix} T_1 \\ T_2 \\ T_3 \\ T_4 \end{bmatrix} \quad f(t, \Theta) = \begin{bmatrix} f_1(t, \theta_1) \\ f_2(t, \theta_2) \\ f_3(t, \theta_3) \\ f_4(t, \theta_4) \end{bmatrix} \quad \text{(E1)}$$

Here, $T_i$ and $f_i(t,\theta_i)$ are the failure times and functional approximation of the exemplar degradation signal path respectively, $\theta_i$ are the parameters of the functional approximation of the $i^{th}$ exemplar degradation signal path, and $\Theta$ are all of the parameters of each functional approximation.

Figure 8:
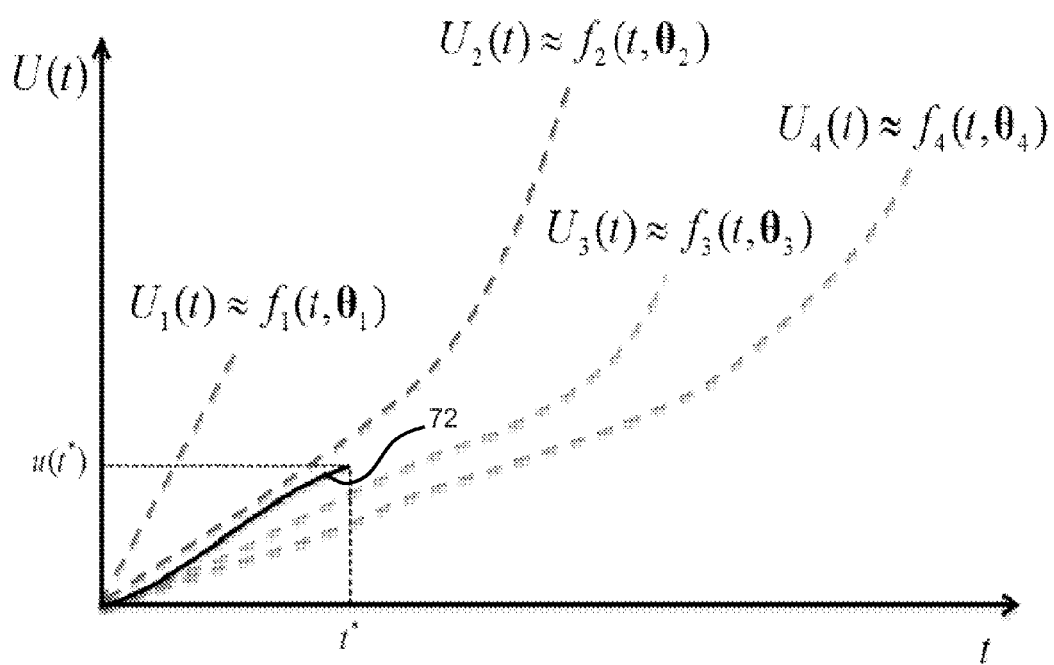
FIG. 8 illustrates a plot of an observation of a degradation signal of an asset at time t* relative to the functional approximations of the exemplar assets shown by dashed lines.

To employ the method and system 10, the degradation signal of another, similar asset (e.g., at least the one asset 18) is monitored and an estimate of the remaining useful life 64 of the similar asset is determined at an arbitrary time t*. Such a case is presented in FIG. 8, where the degradation signal is plotted as a solid path 72. The observation of the degradation signal at time t* is written as u(t*). To estimate the remaining useful life 64 of the similar asset via the path classification and estimation (PACE) method and system 10, the process presented in FIG. 9 is used.

Figure 9:
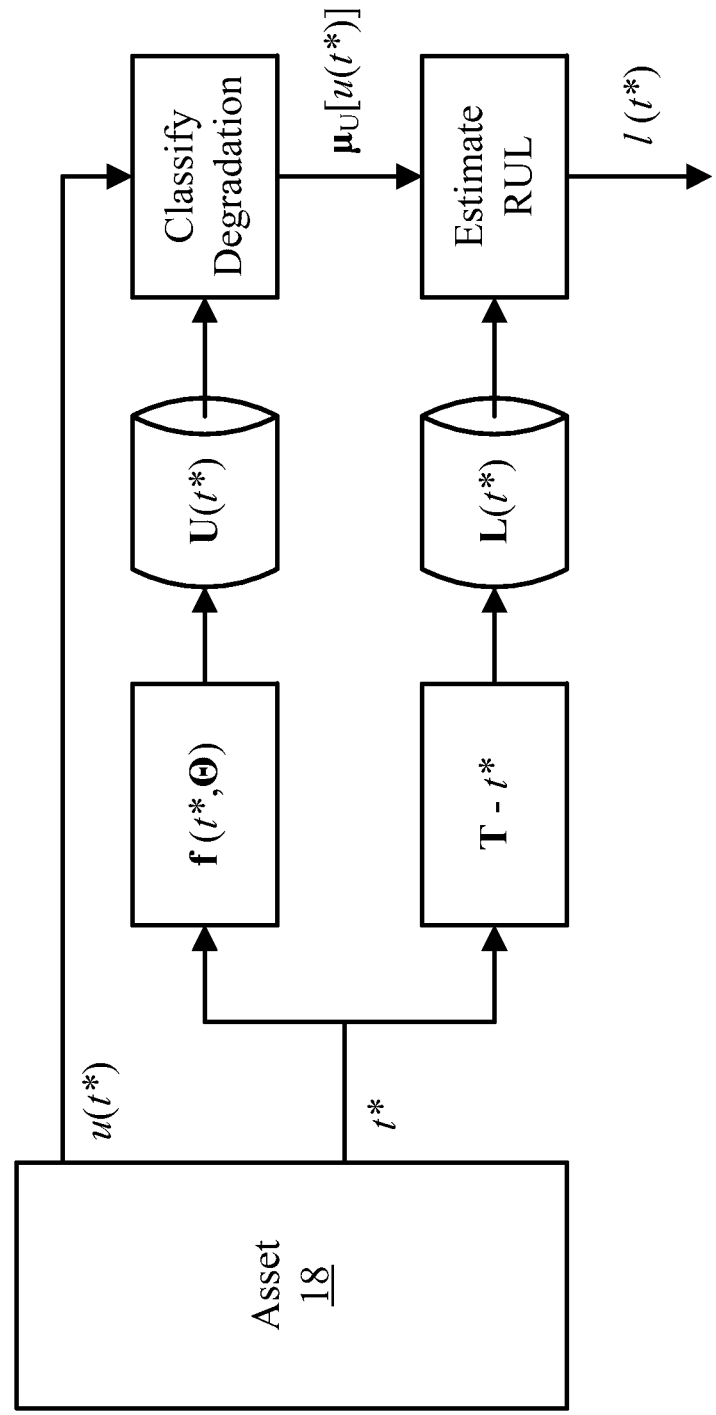
FIG. 9 is a general functional flow diagram detailing an embodiment of a vector analysis procedure of the path classification and estimation method and system for estimating the remaining useful life of an asset.

In general, and referring to FIG. 9, the process for estimating the remaining useful life 64 can be seen to be comprised of three steps. First, the expected degradation signal values according to the exemplar degradation paths are estimated by evaluating the functional approximations functions at t*. At the same time, the expected remaining useful lives are calculated by subtracting the current time t* from the observed failure times of the exemplar paths. Second, the observed degradation signal u(t*) is then classified according to the vector of expected degradation signal values U(t*). The new degradation path is assigned a membership value for each of the historical paths that characterizes it's similarity to that exemplar. Third, the vector of memberships of the observed degradation value to the exemplar degradation paths is combined with the vector of expected remaining useful lives to estimate the remaining useful life of the similar asset space l(t*).

Further details of the path classification and estimation (PACE) method and system 10 will now be described hereinbelow in the context of the present example.

First, the current time t* is used to estimate the expected values of the degradation signal and remaining useful lives according to the exemplar paths. In equation form, the expected values of the degradation signal according to the exemplar paths are the approximating functions evaluated at the current time t*.

$$f(t^*, \Theta) = \begin{bmatrix} f_1(t^*, \theta_1) \\ f_2(t^*, \theta_2) \\ f_3(t^*, \theta_3) \\ f_4(t^*, \theta_4) \end{bmatrix} \quad \text{(E2)}$$

The function evaluations can be interpreted as exemplars of the degradation signal values at time t*. In this context, the above vector can be rewritten as a follows:

$$U(t^*) = \begin{bmatrix} f_1(t^*, \theta_1) \\ f_2(t^*, \theta_2) \\ f_3(t^*, \theta_3) \\ f_4(t^*, \theta_4) \end{bmatrix} = \begin{bmatrix} U_1(t^*) \\ U_2(t^*) \\ U_3(t^*) \\ U_4(t^*) \end{bmatrix} \quad \text{(E3)}$$

The current time t* is used with the vector of failure times to calculate the expected remaining useful lives according to the exemplar degradation paths.

$$L(t^*) = T - t^* = \begin{bmatrix} T_1 - t^* \\ T_2 - t^* \\ T_3 - t^* \\ T_4 - t^* \end{bmatrix} \quad \text{(E4)}$$

Now the currently observed degradation signal value u(t*) can be compared to the expected degradation signal values U(t*) by any one of a number of known classification methods (e.g., clustering, nearest neighbor, k-nearest neighbor, non-parametric regression, fuzzy logic, neural networks, et cetera) to obtain a vector of memberships $\mu_U[u(t^*)]$. Here, $\mu_{U_i}[u(t^*)]$ denotes the membership of u(t*) to the $i^{th}$ exemplar path.

$$\mu_U[u(t^*)] = \begin{bmatrix} \mu_{U_1}[u(t^*)] \\ \mu_{U_2}[u(t^*)] \\ \mu_{U_3}[u(t^*)] \\ \mu_{U_4}[u(t^*)] \end{bmatrix} \quad \text{(E5)}$$

Finally, the above memberships and the expected remaining useful lives are combined to estimate the current remaining useful life l(t*) of the individual asset. For example, a simple weighted average could be used. To construct the simple weighted average, the memberships could be calculated to have values on [0,1] or scalar values between 0 and 1 with the sum of the memberships normalized to a value of 1. The weighted average remaining useful life is then given by the following:

$$l(t^*) = \sum_i^n (\mu_{U_i}[u(t^*)] \cdot L_i(t^*))$$

Other combination methods include: selecting the example RUL that has the highest membership, setting the RUL to be an average of the k largest memberships, using statistical and/or machine learning (i.e. neural networks, fuzzy logic, et cetera) to infer the RUL from the memberships and other factors such as environmental signals, quality factors for each example path (better examples have larger quality factors), or combining a weighted average with an example selector that is affected by the operating conditions. For example, it is possible that the method and system 10 would only use examples 1, 3, and 10 for one operating condition and examples 2, 4, and 12 for a different operating condition.

Figure 10:
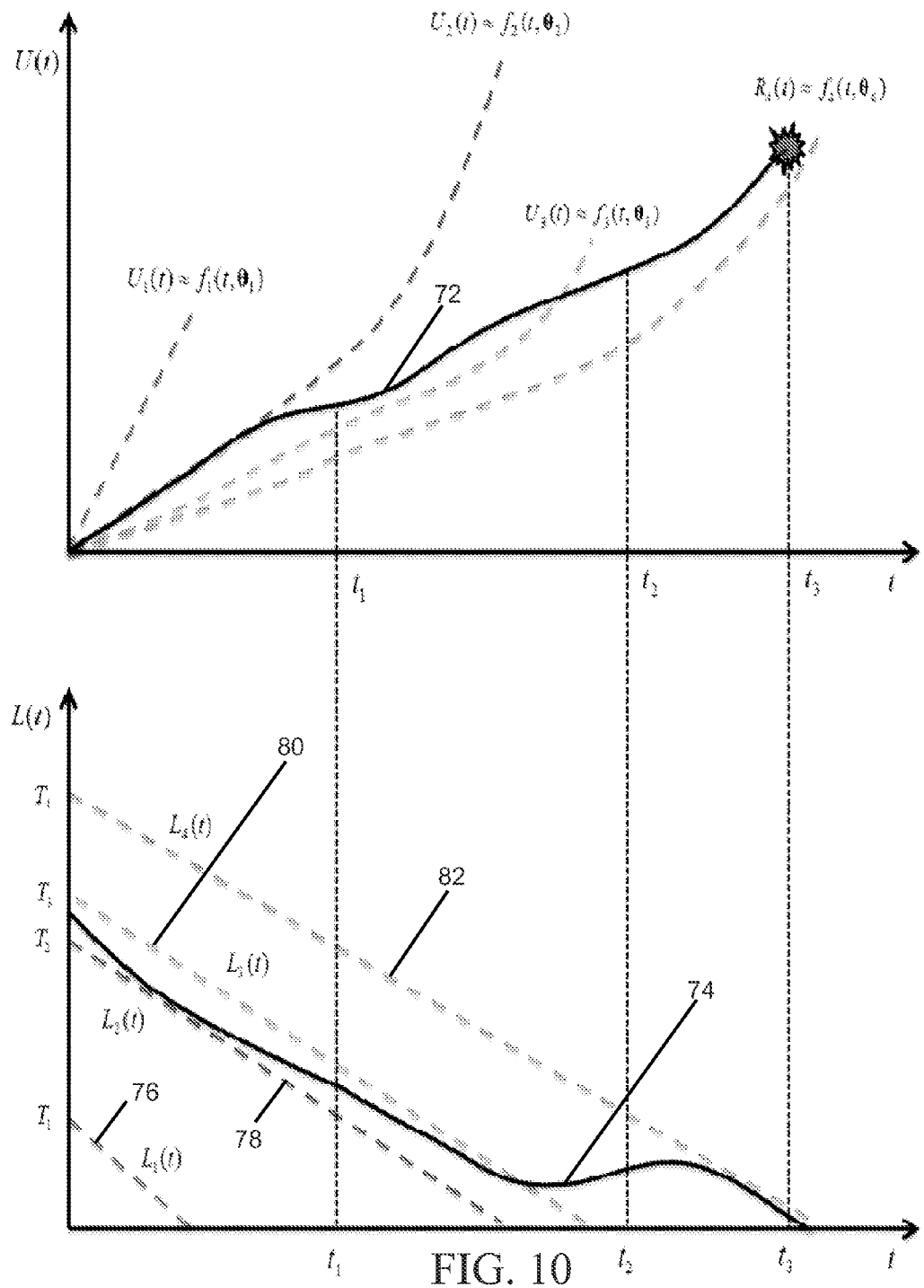
FIG. 10 illustrates a top plot of the functional approximations of the exemplar assets shown by dashed lines and a complete query path of the degradation signal shown in FIG. 8 and a bottom plot illustrating a progression of the remaining useful life for the approximated exemplar paths shown in dashed lines with the remaining useful life for the query path of the degradation signal of the asset shown in solid.

Now that the general process for estimating the remaining useful life at an arbitrary time t* via the path classification and estimation (PACE) method and system 10 has been discussed, the character of the estimates will now be explored. To describe the character of the estimates of the path classification and estimation (PACE) method and system 10 estimates, consider the complete query path of the degradation signal that is presented in the top plot of FIG. 10. The path classification and estimation (PACE) method and system 10 estimates of the remaining useful life are presented in the bottom plot, where the dashed lines designate the progression of the remaining useful life for the approximated exemplar paths. As a starting point, consider the time from 0 to $t_1$. Notice that during this time period, the observed degradation signal values (solid line 74) are very near the functional approximation of the second exemplar path (dashed line 78). What this means is that the query path is very similar to the second exemplar path. It can be seen in the bottom plot that this affinity is reflected in the remaining useful life estimates, which are very near the expected remaining useful lives for the second exemplar path. Next, consider the time between $t_1$ and $t_2$. During this time period, the query path of the degradation signal can be observed to move toward the third exemplar path (dashed line 80). The remaining useful life estimates can be seen to respond to this change by trending away from the remaining useful lives of the second exemplar path (dashed line 78) and toward the third exemplar path (dashed line 80). Finally, consider the time between $t_2$ and $t_3$. Notice that the failure time of the query asset is $t_3$. During this time interval, notice that the query path of the degradation signal can be observed to move toward the fourth exemplar path (dashed line 82). Again, this shift is reflected in the remaining useful life estimates, which shifts toward the remaining useful lives of the fourth exemplar path.

Modification for a Known Failure Threshold

Before the path classification and estimation (PACE) method and system 10 is generalized, the case when a failure threshold for the degradation signal is previously known will be considered. For the working example, suppose that the failure threshold is $U_f$. Since the path classification and estimation (PACE) method and system 10 does not require a threshold, the original degradation signals and their associated failure times will be adjusted before they are used with the path classification and estimation (PACE) method and system 10.

Figure 11:
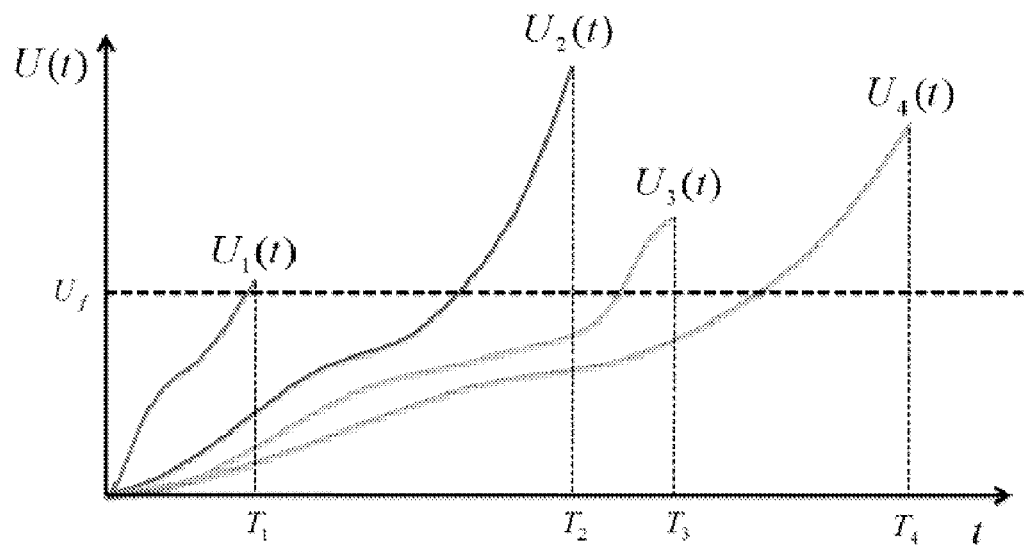
FIG. 11 illustrates a plot of exemplar degradation signals of example assets having failure thresholds.
Figure 12:
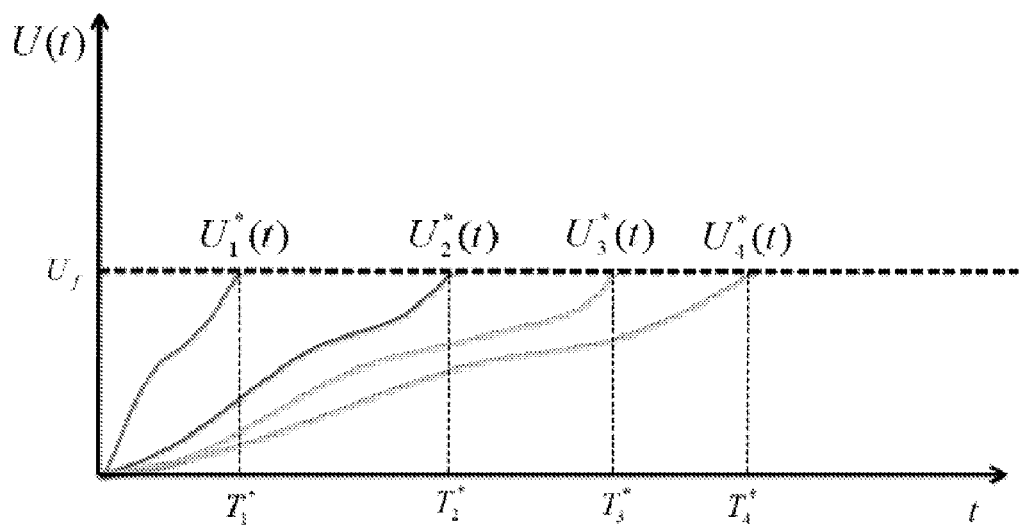
FIG. 12 illustrates a plot illustrating a process by which the exemplar degradation signals having failure thresholds can be modified for use with the path classification and estimation method and system.

FIGS. 11 and 12 present a demonstration of this process. Specifically, the original signals are presented in the top plot and the adjusted signals are presented in the bottom plot. It can be seen that the original degradation signals $U_i(t)$ are "clipped" at the failure threshold resulting in the adjusted degradation signals $U_i^*(t)$ whose maximum value is $U_f$. Next, notice that the failure times are also adjusted to the times when the adjusted degradation signals reach the threshold. More specifically, the adjusted failure times for the $i^{th}$ exemplar degradation signal are set according to the following equation.

$$U_i^*(T_i^*) = U_f \quad (E6)$$

A description of the PACE as it applies to a simple example was presented hereinabove.

Figure 13:
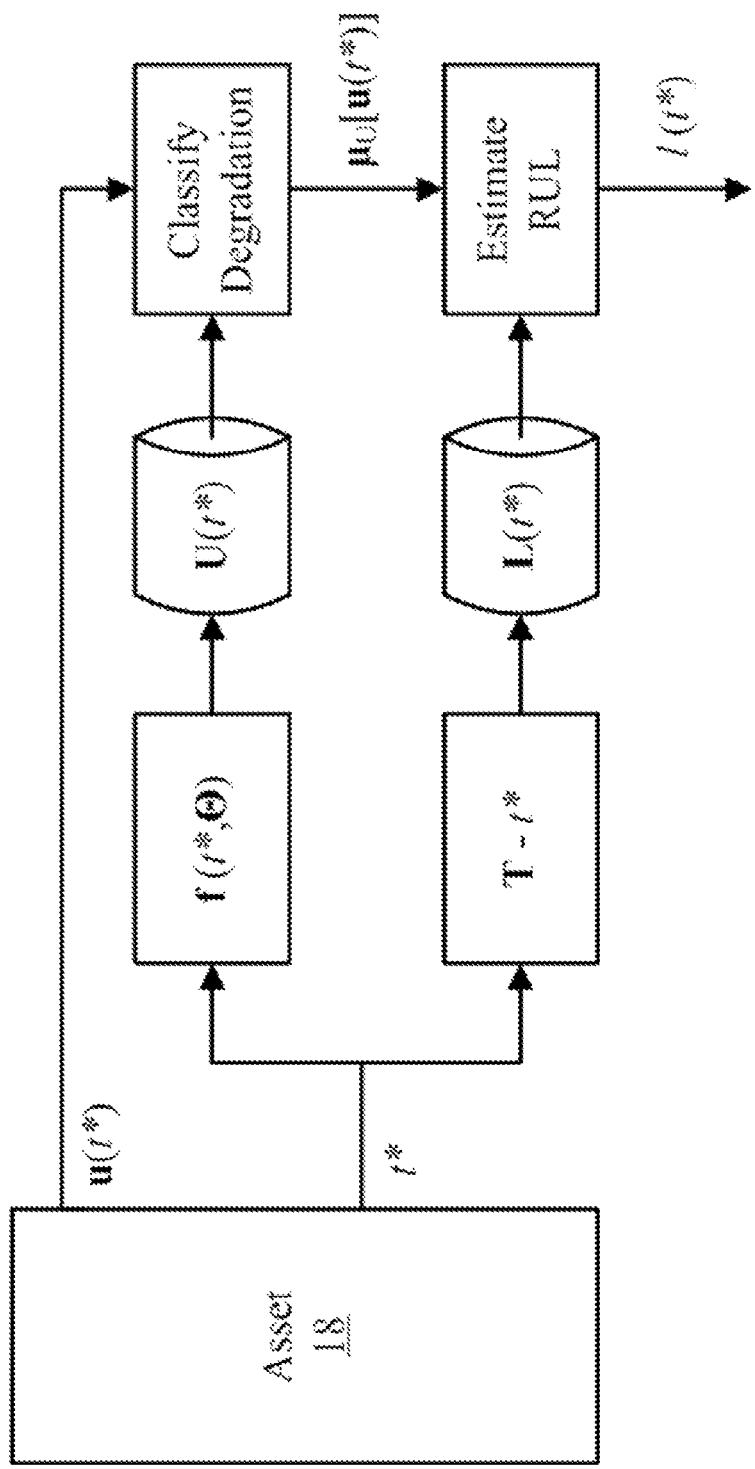
FIG. 13 is a general functional flow diagram detailing an embodiment of a vector analysis procedure of the path classification and estimation method and system generalized for a number of degradation signals and exemplar degradation paths for estimating the remaining useful life of an asset.
Figure 17:
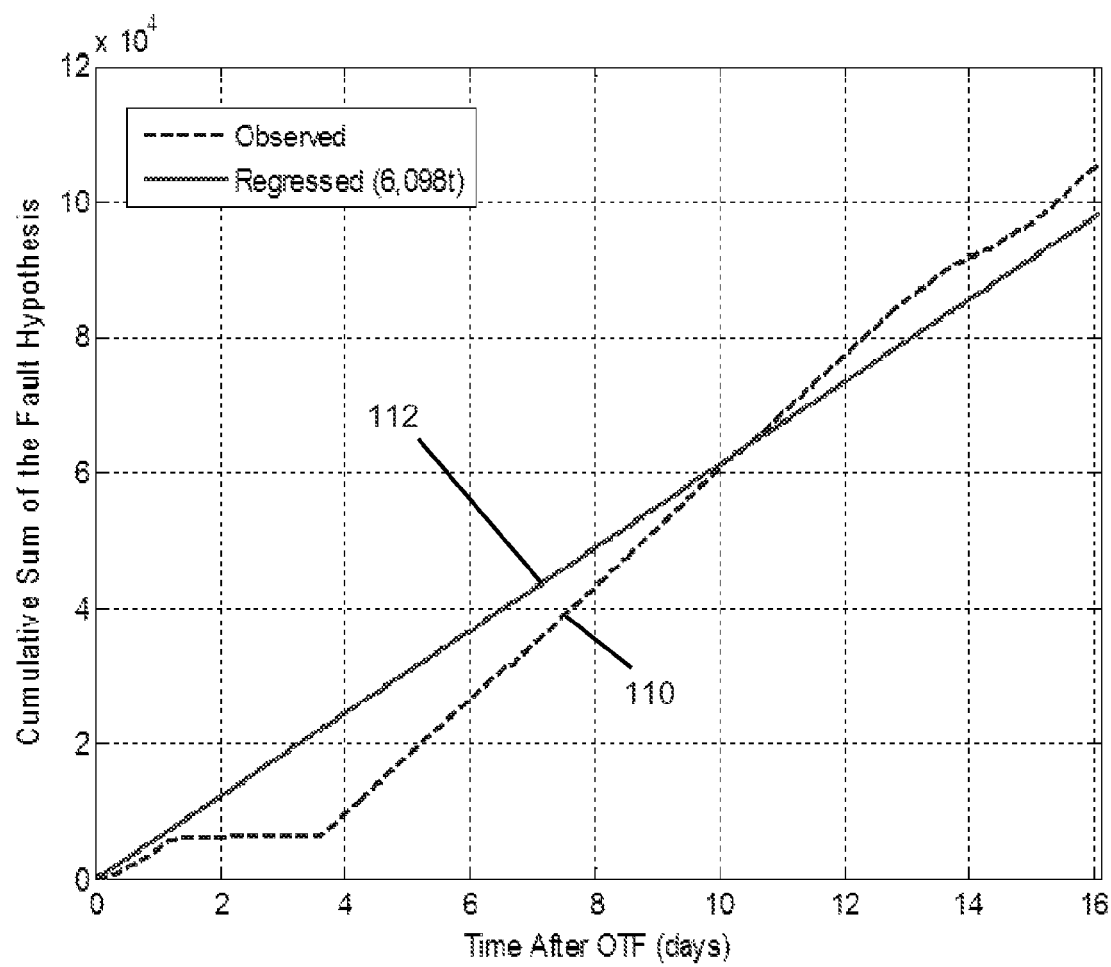
FIG. 17 illustrates a plot of observed and regressed progression values for training power supply number one.

Hereinbelow, the equations developed above are generalized for an arbitrary number of exemplar histories and degradation signals. Additionally, FIG. 13 illustrates a general functional flow diagram detailing an embodiment of a vector analysis procedure of the path classification and estimation method and system generalized for a number of degradation signals and exemplar degradation paths for estimating the remaining useful life of an asset.

Generalized PACE

More specifically, the previously developed equations are generalized for p degradation signals and for n exemplar degradation paths. For this case, the exemplar degradation paths can be characterized by the following matrix of functional approximations:

$$f(t, \Theta) = \begin{bmatrix} f_{1,1}(t, \theta_{1,1}) & f_{1,2}(t, \theta_{1,2}) & \cdots & f_{1,p}(t, \theta_{1,p}) \\ f_{2,1}(t, \theta_{2,1}) & f_{2,2}(t, \theta_{2,2}) & \cdots & f_{2,p}(t, \theta_{2,p}) \\ \vdots & \vdots & \ddots & \vdots \\ f_{n,1}(t, \theta_{n,1}) & f_{n,2}(t, \theta_{n,2}) & \cdots & f_{n,p}(t, \theta_{n,p}) \end{bmatrix} \quad (E7)$$

where:

$f_{i,j}(t, \theta_{i,j})$ is the functional approximation of the $j^{th}$ degradation signal of the $i^{th}$ exemplar history;

$\theta_{i,j}$ are the parameters of the functional approximation of the $j^{th}$ degradation signal of the $i^{th}$ exemplar history; and $\Theta$ are all of the parameters of each functional approximation.

For each of the n exemplar paths, there is an associated failure time. If $T_i$ denotes the failure time of the $i^{th}$ exemplar path, then the vector of failure times can be written as:

$$T = \begin{bmatrix} T_1 \\ T_2 \\ \vdots \\ T_n \end{bmatrix}. \quad (E8)$$

At this point, suppose that the p degradation signals of another similar asset are being monitored and an estimate of the remaining useful life of the similar asset is needed at an arbitrary time $t^*$. First, the current time $t^*$ is used to estimate the expected values of the degradation signals and remaining useful lives according to the n exemplar paths. In equation form, the expected values of the p degradation signals according to the n exemplar paths are simply the approximating functions evaluated at the current time $t^*$.

$$f(t^*, \Theta) = \begin{bmatrix} f_{1,1}(t^*, \theta_{1,1}) & f_{1,2}(t^*, \theta_{1,2}) & \cdots & f_{1,p}(t^*, \theta_{1,p}) \\ f_{2,1}(t^*, \theta_{2,1}) & f_{2,2}(t^*, \theta_{2,2}) & \cdots & f_{2,p}(t^*, \theta_{2,p}) \\ \vdots & \vdots & \ddots & \vdots \\ f_{n,1}(t^*, \theta_{n,1}) & f_{n,2}(t^*, \theta_{n,2}) & \cdots & f_{n,p}(t^*, \theta_{n,p}) \end{bmatrix} \quad (E9)$$

The values of the above function evaluations can be interpreted as exemplars of the p degradation signals at time $t^*$. In this context, the above vector can be rewritten by the following equations, where $U_{i,j}$ is the $j^{th}$ degradation signal of the $i^{th}$ exemplar path.

$$U(t^*) = \begin{bmatrix} f_{1,1}(t^*, \theta_{1,1}) & f_{1,2}(t^*, \theta_{1,2}) & \cdots & f_{1,p}(t^*, \theta_{1,p}) \\ f_{2,1}(t^*, \theta_{2,1}) & f_{2,2}(t^*, \theta_{2,2}) & \cdots & f_{2,p}(t^*, \theta_{2,p}) \\ \vdots & \vdots & \ddots & \vdots \\ f_{n,1}(t^*, \theta_{n,1}) & f_{n,2}(t^*, \theta_{n,2}) & \cdots & f_{n,p}(t^*, \theta_{n,p}) \end{bmatrix} \quad (E10)$$

$$U(t^*) = \begin{bmatrix} U_{1,1}(t^*, \theta_{1,1}) & U_{1,2}(t^*, \theta_{1,2}) & \cdots & U_{1,p}(t^*, \theta_{1,p}) \\ U_{2,1}(t^*, \theta_{2,1}) & U_{2,2}(t^*, \theta_{2,2}) & \cdots & U_{2,p}(t^*, \theta_{2,p}) \\ \vdots & \vdots & \ddots & \vdots \\ U_{n,1}(t^*, \theta_{n,1}) & U_{n,2}(t^*, \theta_{n,2}) & \cdots & U_{n,p}(t^*, \theta_{n,p}) \end{bmatrix}$$

At the same time, the current time t* is used with the vector of failure times to calculate the expected remaining useful lives according to the exemplar degradation paths.

$$L(t^*) = T - t^* = \begin{bmatrix} T_1 - t^* \\ T_2 - t^* \\ \vdots \\ T_n - t^* \end{bmatrix} \quad (E11)$$

The currently observed values for the p degradation signals can be written as a vector u(t*), where $u_j(t^*)$ is the currently observed value for the $j^{th}$ degradation signal.

$$u(t^*) = [u_1(t^*) u_2(t^*) \ldots u_p(t^*)] \quad (E12)$$

The values contained in u(t*) can be compared to the expected degradation signal values U(t*) by any one of a number of classification algorithms to obtain a vector of memberships $\mu_U[u(t^*)]$. Here, $\mu_{U_i}[u(t^*)]$ denotes the membership of u(t*) to the $i^{th}$ exemplar path. Notice that the memberships are a vector and not a matrix. What this means is that the classification algorithm has aggregated the similarities contained in the p degradation signal observations to determine the overall membership or similarity between the query and each exemplar path. This feature is important when considering the way in which different inference algorithms are integrated into the path classification and estimation (PACE) method and system 10.

$$\mu_U[u(t^*)] = \begin{bmatrix} \mu_{U_1}[u(t^*)] \\ \mu_{U_2}[u(t^*)] \\ \vdots \\ \mu_{U_4}[u(t^*)] \end{bmatrix} \quad (E13)$$

Finally, the above memberships and the expected remaining useful lives are combined to estimate the current remaining useful life l(t*) of the individual asset. For example, a simple weighted average could be used. To construct the simple weighted average, the memberships could be calculated to have values on [0,1] or scalar values between 0 and 1 with the sum of the memberships normalized to a value of 1. The weighted average remaining useful life is then given by the following:

$$l(t^*) = \sum_{i}^{n} (\mu_{U_i}[u(t^*)] \cdot L_i(t^*))$$

Combination methods include: simple weighted average, selecting the example RUL that has the highest membership, setting the RUL to be an average of the k largest memberships, using statistical and/or machine learning (i.e. neural networks, fuzzy logic, et cetera) to infer the RUL from the memberships and other factors such as environmental signals, quality factors for each example path (better examples have larger quality factors), or combining a weighted average with an example selector that is affected by the operating conditions. For example, it is possible that the method and system 10 would only use examples 1, 3, and 10 for one operating condition and examples 2, 4, and 12 for a different operating condition.

Hereinabove, the path classification and estimation (PACE) method and system 10 was generalized to include an arbitrary number of degradation signals and exemplar paths. Hereinbelow, some advantages of the path classification and estimation (PACE) method and system 10 will be enumerated.

Advantages of the PACE

In one aspect, an advantage of the path classification and estimation (PACE) method and system 10 as opposed to the other prognostic methods is that a failure threshold is not required. This advantage is realized for applications where a failure threshold is not previously known or cannot be accurately estimated from collected data or engineering judgment.

In another aspect, an advantage of the path classification and estimation (PACE) method and system 10 is that if the failure threshold is known ahead of time, the only modification that needs to be made is that associated failure times need only be adjusted such that degradation signal values that exceed the threshold are interpreted as having failed.

In another aspect, an advantage of the path classification and estimation (PACE) method and system 10 is that it is flexible enough to dynamically track changes in asset behavior that would result in a marked change in the remaining useful life estimates. To illustrate this advantage, in life consumption modeling (LCM) as a asset is used its degradation fraction monotonically increases thereby producing monotonically decreasing remaining useful life estimates. What this means is that as an asset is used, its remaining useful life will always decrease. This assumption limits the LCM method in that no mechanism is provided for allowing the remaining useful life estimates to correct themselves. In other words, if the degradation is estimated to progress along a fast failure mode, but then moves to a slower failure mode, there is no way to compensate for any errors in the remaining useful life estimates that could have been incurred during the time required to detect the shift in degradation rate. In contrast to these shortcomings, the path classification and estimation (PACE) method and system 10 is able to reflect changes in degradation that lead to changes in the remaining useful life estimates.

In another aspect, an advantage of the path classification and estimation (PACE) method and system 10 is that since the individual analysis procedures are founded on general concepts, such as function approximation, classification, and estimation, there is not a limitation on the algorithm types used for the individual analysis procedures.

In yet another aspect, an advantage of the path classification and estimation (PACE) method and system 10 is its flexibility to incorporate physical simulations of degradation and expert opinion into its example data. Hence, the reliance on the existence of a sample of the degradation paths is effectively transformed into an advantage in the sense that alternative individual based prognosis algorithms do not provide a means for incorporating sparse information.

Accordingly, and in one aspect, FIG. 14 illustrates a detailed flowchart view of an embodiment of a computer-implemented method for estimating a remaining useful life of the current asset 18. Additionally, an embodiment of the invention provides a computer-readable medium 68 having computer executable instructions recorded thereon which causes, in use, the computer 12 running the instructions to generally execute a procedure according to the computer-implemented method illustrated in FIG. 14.

Exemplary Applications

In use and operation, and referring to FIGS. 1 through 19, the path classification and estimation (PACE) method and system 10 will be further exemplified from the results of its use and operation in estimating the remaining useful life of individual steering systems of deep oil exploration drills and enterprise class server power supplies. The results of these applications are presented hereinbelow.

Steering System

For this work multiple prognosers were developed for two fault modes, namely mud invasion (MI) and pressure transducer offset (PTO). The first prognoser is a population prognoser that estimates the remaining useful life (RUL) via a conditional mean of the population's time-to-failure distribution. The second prognoser is a path classification and estimation (PACE) prognoser trained to relate the cumulative vibration stress to the RUL. Finally, the third prognoser is a PACE prognoser trained to relate the cumulative number of fault alarms to the RUL.

A summary of the accuracy of the population, causal, and effect prognosers is presented in FIG. 15. The mean absolute error (MAE) of the RUL estimates in hours is presented in the left column of the table. The life of the asset in hours is presented in the middle column. Next, the MAE as a percentage of the asset life is presented in the right column of the table. Finally, MI and PTO designate two failure modes of the drill's hydraulic units, namely mud invasion and pressure transducer offset, respectively.

There are several features of the results that bear mentioning. Overall, notice that the individual based prognosers (causal and effect) significantly outperform the population based prognosers, in that the MAE as a percentage of the asset life ranges from 53-60% for the population prognosers and ranges from 0.8-13% for the individual based prognosers. What this means is that the individual based prognosers are able to predict the time of failure more accurately than the population prognoser. Next, notice that there is a general trend in the MAE over all of the prognosers that begins with large errors for the population based prognoser, progresses toward intermediate errors for the causal prognoser, and then finally reaches a minimum error for the effect prognoser. This trend, however, is not complete, in that the smallest error for the PTO is produced by the causal prognoser at 2.4% of the asset life, while the intermediate error is produced by the effect prognoser at 13.2%.

Server Power Supplies

Three power supplies (PS) were successfully cycled until failure. For each of these sets, a monitoring system was used to generate the degradation signal (cumulative sum of the fault alarms). Next, onset-to-failure (OTF) is defined as being the instant in time when 500 fault alarms have been registered. The degradation is parameterized by linear regression of the degradation onto the time after OTF. Other, more complicated, regression functions were applied to the data, but it was found that standard linear regression was sufficient to produce accurate RUL estimates. Also, it is important to note that prior to performing the regression, 500 was subtracted from each history to force the regressed line through the origin.

A summary of the two histories that were used to train the PACE prognoser and the validation history are presented in FIG. 16. An example degradation history and its associated regressed values are also presented in FIG. 17. The dashed plot 110 is the observed progression and the solid plot 112 is the regressed progression.

Finally, the RUL was estimated by providing the trained PACE prognoser with observations of the prognostic parameter for the validation PS. The resulting RUL estimates (solid plot 114) and their target values (dashed plot 116) are presented in FIG. 18. The progression of the training power supplies are also presented as dashed plots 118 and 120. Notice that the RUL estimates begin by sharply oscillating between the first and second training power supply. As the degradation continues, it can be seen that the RUL estimates approach their target values beginning around the $5^{th}$ hour after OTF. Since these estimates are made by considering only two degradation histories, as more data is made available the performance should improve significantly.

Figures 18, 19:
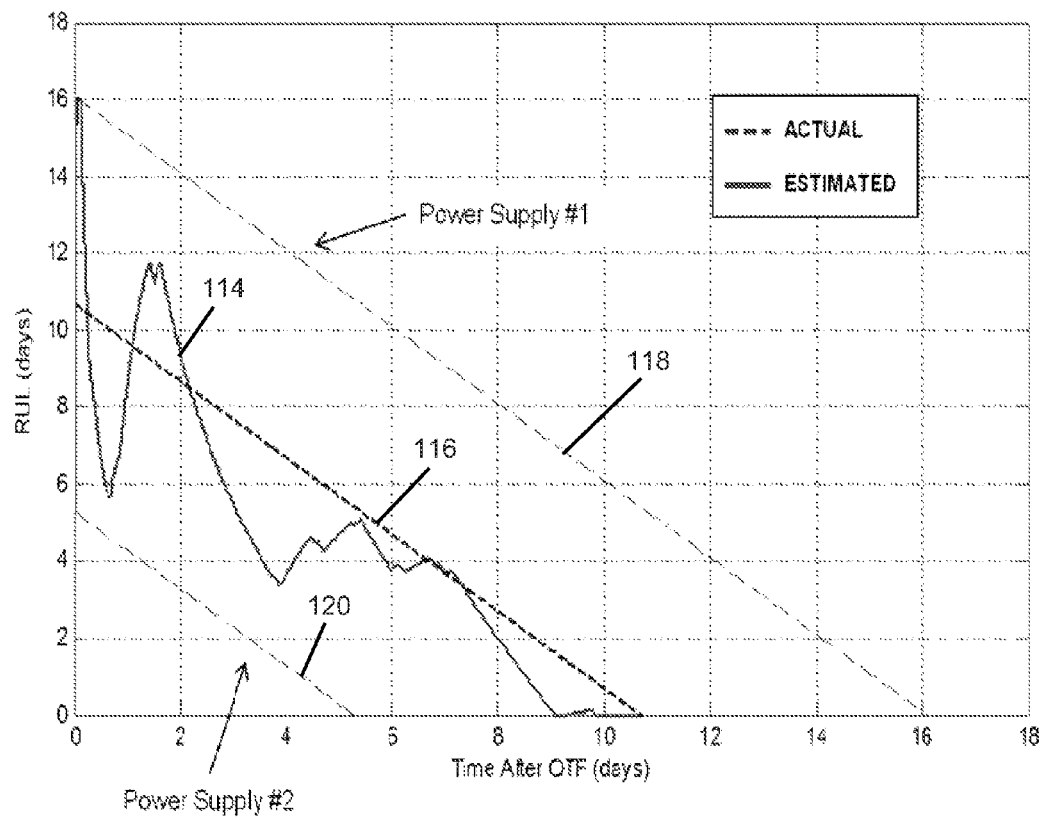
FIG. 18 illustrates a plot of remaining useful life estimates and target values for the validation power supply.
FIG. 19 illustrates a summary table of statistics for residual values (target values minus estimate values) of the remaining useful life of the validation power supply.

Finally, to assess the uncertainties of the estimates, the statistics of the residuals (target−estimates) were calculated and are listed below in FIG. 19. As expected, the distribution of the errors is very large, mainly 95% of the error is contained on negative 2.47 days to positive 3.34 days. This indicates that 95% of the time, the RUL estimate will be either overestimated by approximately 2.5 days or underestimated by approximately 3.3 days. However, a beneficial feature of this result is that the RUL estimate improves over time. To illustrate this feature, consider the summary statistics for the first and second half of the data as presented in the bottom two rows of FIG. 19. Because the estimates on the first half of the data swing sharply from over estimating to under estimating the RUL, the associated uncertainty bounds cover a range of approximately 7.53 days. Conversely, the summary statistics for the second half of the data show that the range has decreased by approximately 47% to 3.96 days.

To conclude this discussion, the mean absolute error (MAE) of the RUL estimates is evaluated. Overall, the MAE was calculated to be 1.35 days. In terms of the lifetime after OTF (10.71 days), the MAE was calculated to be 12.6%. The accuracies for the first and second half of the degradation history give MAEs of 2.03 days (19.0% of the lifetime after OTF) and 0.66 days (6.2% of the lifetime after OTF), respectively.

These exemplary applications have demonstrated that the path classification and estimation (PACE) method and system 10 can be used to produce accurate estimates of the RUL of an individual asset.

Accordingly, it should be apparent that further numerous structural modifications and adaptations may be resorted to without departing from the scope and fair meaning of the present invention as set forth hereinabove and as described herein below by the claims.

I claim:

1. A computer-implemented method for estimating a remaining useful life of a current asset, comprising the steps of:

obtaining exemplar degradation data from at least two exemplar assets;

constructing a vector of exemplar failure times and a vector of functional approximations from the exemplar degradation data;

acquiring observed degradation data from a current asset over a period of time that includes a defined time t;

subtracting the defined time t from each of the exemplar failure times for obtaining a vector of expected remaining useful lives;

evaluating the vector of functional approximations at the defined time t for obtaining a vector of expected degradation data values;

evaluating the observed degradation data at the defined time t for obtaining an observed degradation data value;

classifying the observed degradation data value as a function of the expected degradation data values by assigning a membership value to each of the expected degradation data values as a function of similarity to the observed degradation data value for obtaining a vector of memberships; and combining, with a computer, the vector of memberships with the vector of expected remaining useful lives for estimating a remaining useful life value for the current asset.

2. The computer-implemented method of claim 1 further comprising a step of communicating the estimated remaining useful life value to a remote computer.

3. The computer-implemented method of claim 1 further comprising a step of displaying the estimated remaining useful life value on a display.

4. The computer-implemented method of claim 1 further comprising a step of modifying the exemplar degradation data to accommodate a failure threshold.

5. A system for estimating a remaining useful life of a current asset, said system comprising:
- means for obtaining degradation data from at least two exemplar assets;
- means for constructing a vector of exemplar failure times and a vector of functional approximations from the obtained degradation data;
- a data acquisition device for acquiring observed degradation data from a current asset over a period of time that includes a defined time t;
- means for subtracting the defined time t from each of the exemplar failure times for obtaining a vector of expected remaining useful lives;
- means for evaluating the vector of functional approximations at the defined time t for obtaining a vector of expected degradation data values;
- means for evaluating the observed degradation data at the defined time t for obtaining an observed degradation data value;
- means for classifying the observed degradation data value as a function of the expected degradation data values by assigning a membership value to each of the expected degradation data values as a function of similarity to the observed degradation data value for obtaining a vector of memberships; and
- means for combining the vector of memberships with the vector of expected remaining useful lives for estimating a remaining useful life value for the current asset.

6. The system of claim 5 further comprising means for communicating the estimated remaining useful life value for the current asset to a remote computer.

7. The system of claim 5 further comprising means for displaying the estimated remaining useful life value for the current asset on a display.

8. The system of claim 5 further comprising means for modifying the obtained degradation data to accommodate a failure threshold.

9. A non-transitory computer-readable medium having computer executable instructions for performing a method for estimating a remaining useful life of a current asset, the method comprising the steps of:
- obtaining degradation data from at least two exemplar assets;
- constructing a vector of exemplar failure times and a vector of functional approximations from the obtained degradation data;
- acquiring observed degradation data from a current asset over a period of time that includes a defined time t;
- subtracting the defined time t from each of the exemplar failure times for obtaining a vector of expected remaining useful lives;
- evaluating the vector of functional approximations at the defined time t for obtaining a vector of expected degradation data values;
- evaluating the observed degradation data at the defined time t for obtaining an observed degradation data value;
- classifying the observed degradation data value as a function of the expected degradation data values by assigning a membership value to each of the expected degradation data values as a function of similarity to the observed degradation data value for obtaining a vector of memberships; and
- combining the vector of memberships with the vector of expected remaining useful lives for estimating a remaining useful life value for the current asset.

10. The non-transitory computer-readable medium of claim 9 wherein the method further comprises a step of modifying the exemplar degradation data to accommodate a failure threshold.

11. The non-transitory computer-readable medium of claim 9 wherein the method further comprises a step of communicating the estimated remaining useful life value for the current asset to a remote computer.

12. The non-transitory computer-readable medium of claim 9 wherein the method further comprises a step of displaying the estimated remaining useful life value for the current asset on a display.

* * * * *